Figure 1:
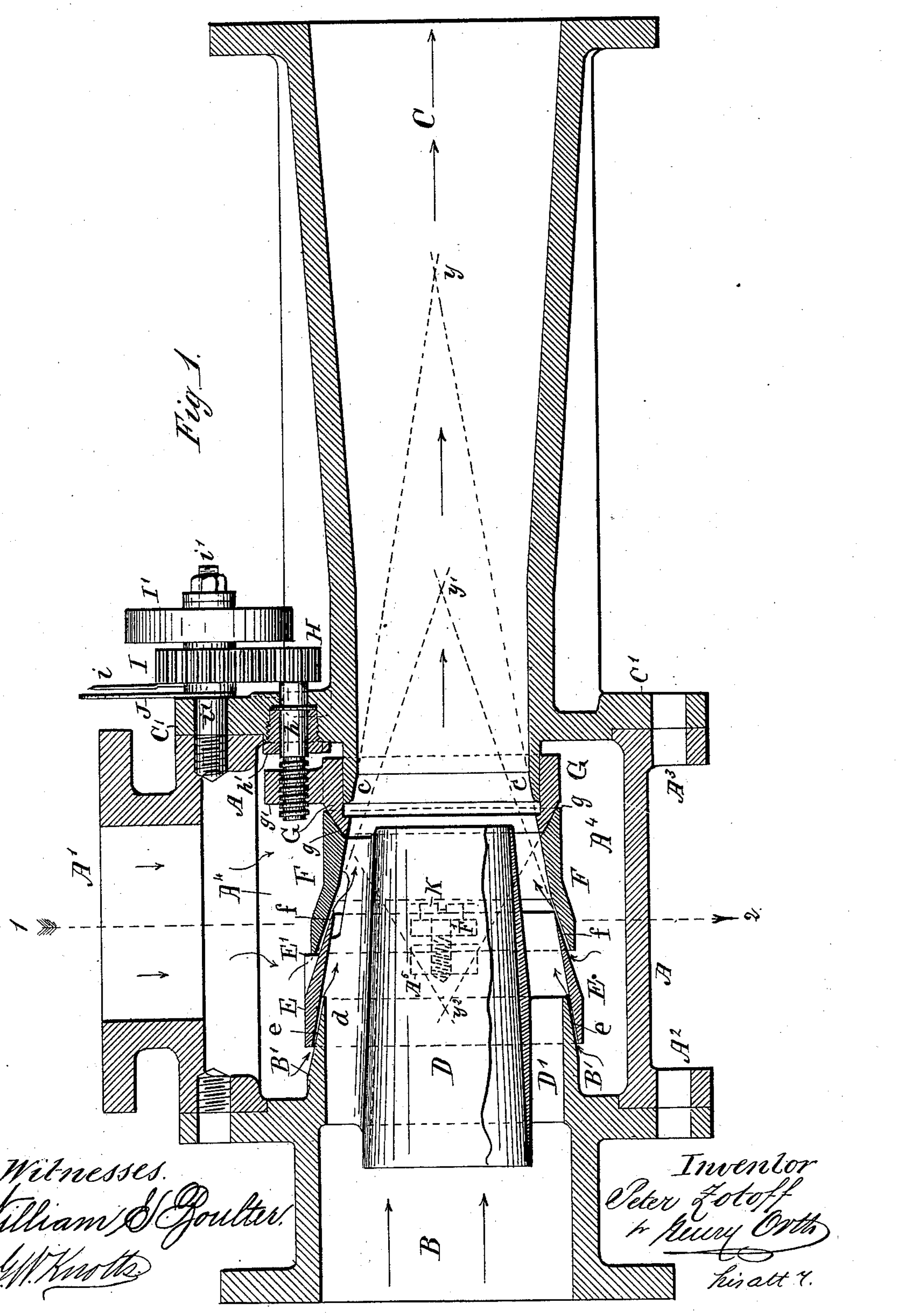

(Model.)

9 Sheets—Sheet 1.

P. ZOTOFF.

EJECTOR.

No. 302,182.

Patented July 15, 1884.

Witnesses.
William S. Boulter.
G. W. Knotts.

Inventor
Peter Zotoff
by Henry Orth
his att'y.

N. PETERS, Photo-Lithographer, Washington, D. C.

(Model.)

9 Sheets—Sheet 2.

P. ZOTOFF.

EJECTOR.

No. 302,182. Patented July 15, 1884.

Witnesses.
William S. Boulter
G. W. Knotts

Inventor
Peter Zotoff
per Henry Orth
his att'y.

N. PETERS, Photo-Lithographer, Washington, D. C.

(Model.)

9 Sheets—Sheet 3.

P. ZOTOFF.

EJECTOR.

No. 302,182.

Patented July 15, 1884.

Witnesses.
William S. Boulter
W. Knoth

Inventor
Peter Zotoff
per Henry Orth
his att'y.

N. PETERS, Photo-Lithographer, Washington, D. C.

(Model.)

9 Sheets—Sheet 4.

P. ZOTOFF.

EJECTOR.

No. 302,182. Patented July 15, 1884.

Witnesses.
William E. Boulter.
W. Knothe

Inventor
Peter Zotoff
pr Henry Orth
his att'y.

N. PETERS, Photo-Lithographer, Washington, D. C.

(Model.)

9 Sheets—Sheet 5.

P. ZOTOFF.

EJECTOR.

No. 302,182. Patented July 15, 1884.

Witnesses.
W. S. Boulter.
J. W. Knoth

Inventor
Peter Zotoff
per Henry Orth
his att'y.

N. PETERS, Photo-Lithographer, Washington, D. C.

(Model.)

9 Sheets—Sheet 6.

P. ZOTOFF.

EJECTOR.

No. 302,182. Patented July 15, 1884.

Witnesses
William E. Boulter.
G. W. Knothe

Inventor
Peter Zotoff
per Henry Orth
his atty.

N. PETERS, Photo-Lithographer, Washington, D. C.

(Model.)

9 Sheets—Sheet 7.

P. ZOTOFF.

EJECTOR.

No. 302,182. Patented July 15, 1884.

Witnesses.
William S. Boulter.
W. Knote

Inventor
Peter Zotoff
pr Henry Orth
his att'y

N. PETERS, Photo-Lithographer, Washington, D. C.

(Model.)

9 Sheets—Sheet 8.

P. ZOTOFF.

EJECTOR.

No. 302,182. Patented July 15, 1884.

Witnesses
William S. Boulter
[illegible]

Inventor
Peter Zotoff
per Henry Orth
his att'y

N. PETERS, Photo-Lithographer, Washington, D. C.

(Model.)

9 Sheets—Sheet 9.

P. ZOTOFF.

EJECTOR.

No. 302,182. Patented July 15, 1884.

Witnesses.
William E. Boulter
G. W. Knoth

Inventor
Peter Zotoff
pr Henry Orth
his atty

N. PETERS, Photo-Lithographer, Washington, D. C.

UNITED STATES PATENT OFFICE.

PETER ZOTOFF, OF CRONSTADT, RUSSIA.

EJECTOR.

SPECIFICATION forming part of Letters Patent No. 302,182, dated July 15, 1884.

Application filed May 8, 1883. (Model.) Patented in France May 30, 1883, No. 155,768; in Belgium August 17, 1883, No. 62,344; in England August 28, 1883, No. 4,161; in Sweden December 3, 1883; in Denmark December 24, 1883, No. 2,186, and in Norway May 20, 1884.

*To all whom it may concern:*

Be it known that I, PETER ZOTOFF, a subject of the Czar of Russia, residing in Cronstadt, Russia, have invented certain Improvements in Ejectors and in the Mode of Operating the Same, of which the following is a specification.

My invention relates to a novel construction and mode of working ejectors, and to their application for utilizing the exhaust or blow-off steam of steam-engines, whereby the noise attending the exhaust or the blowing off of steam is entirely avoided. I have found that when steam is forced through an ejector under certain conditions it not only becomes noiseless, but is at once condensed and discharged in the form of water. By my novel construction and mode of operating or working the ejector I not only attain the result aimed at—namely, to render the exhaust or the blowing off of steam entirely noiseless—but I also obtain a powerful ejector applicable for various uses—as, for instance, for ejecting the bilge-water from ships, or for ejecting water for washing the decks of a ship, or for use in case of fire. In the application of the ejector for the purposes enumerated, or for other purposes to which it is or may be employed, its construction will vary to adapt it to the particular work it is to perform.

In the accompanying drawings I have illustrated several constructions for use of the ejector under various conditions.

Figure 4:
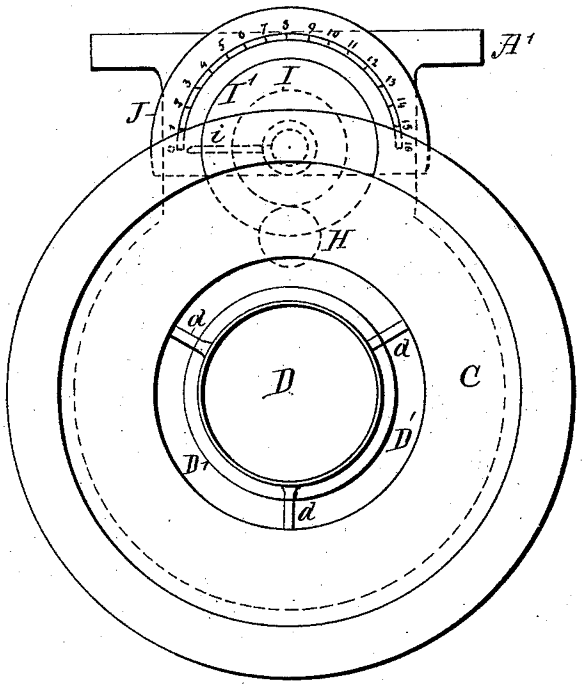
Figure 2:
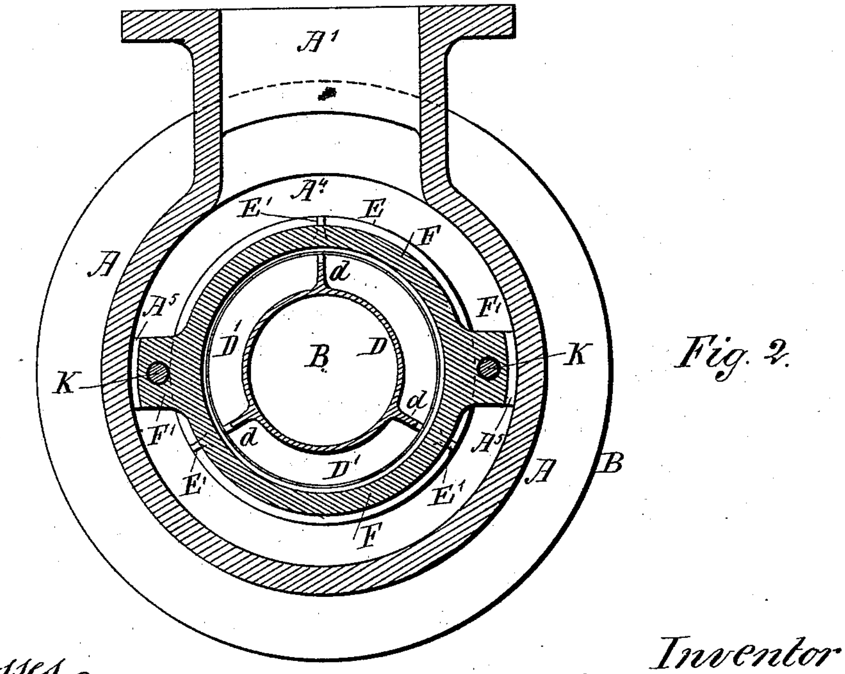
Figure 3:
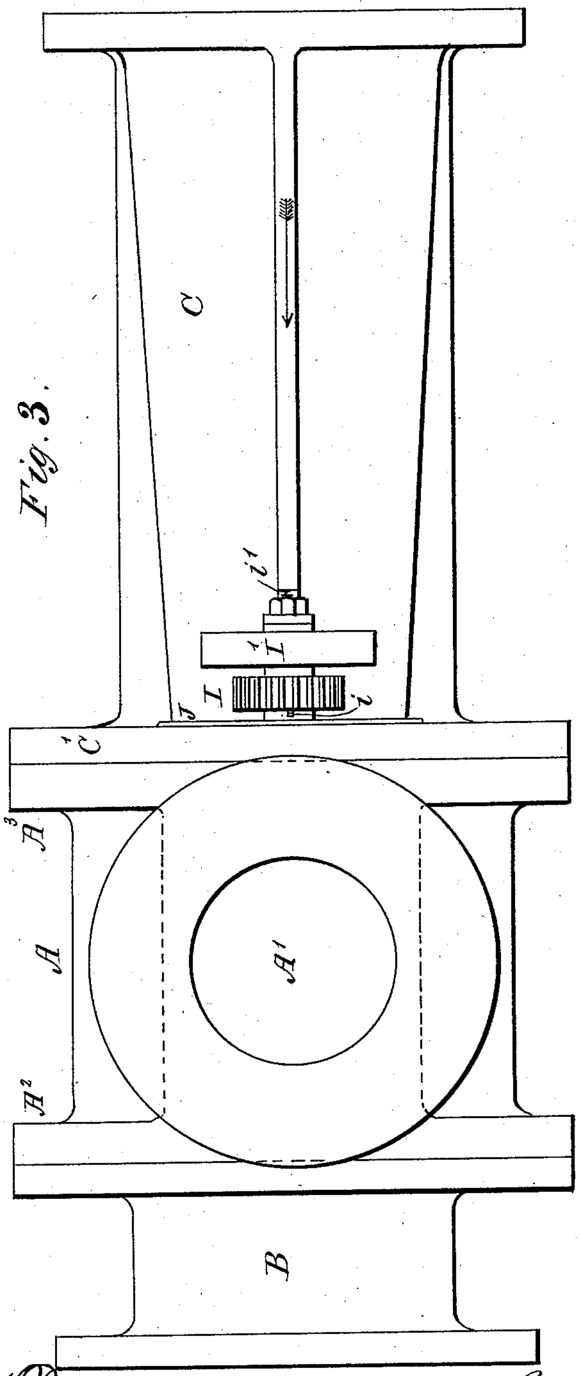
Figures 5, 6:
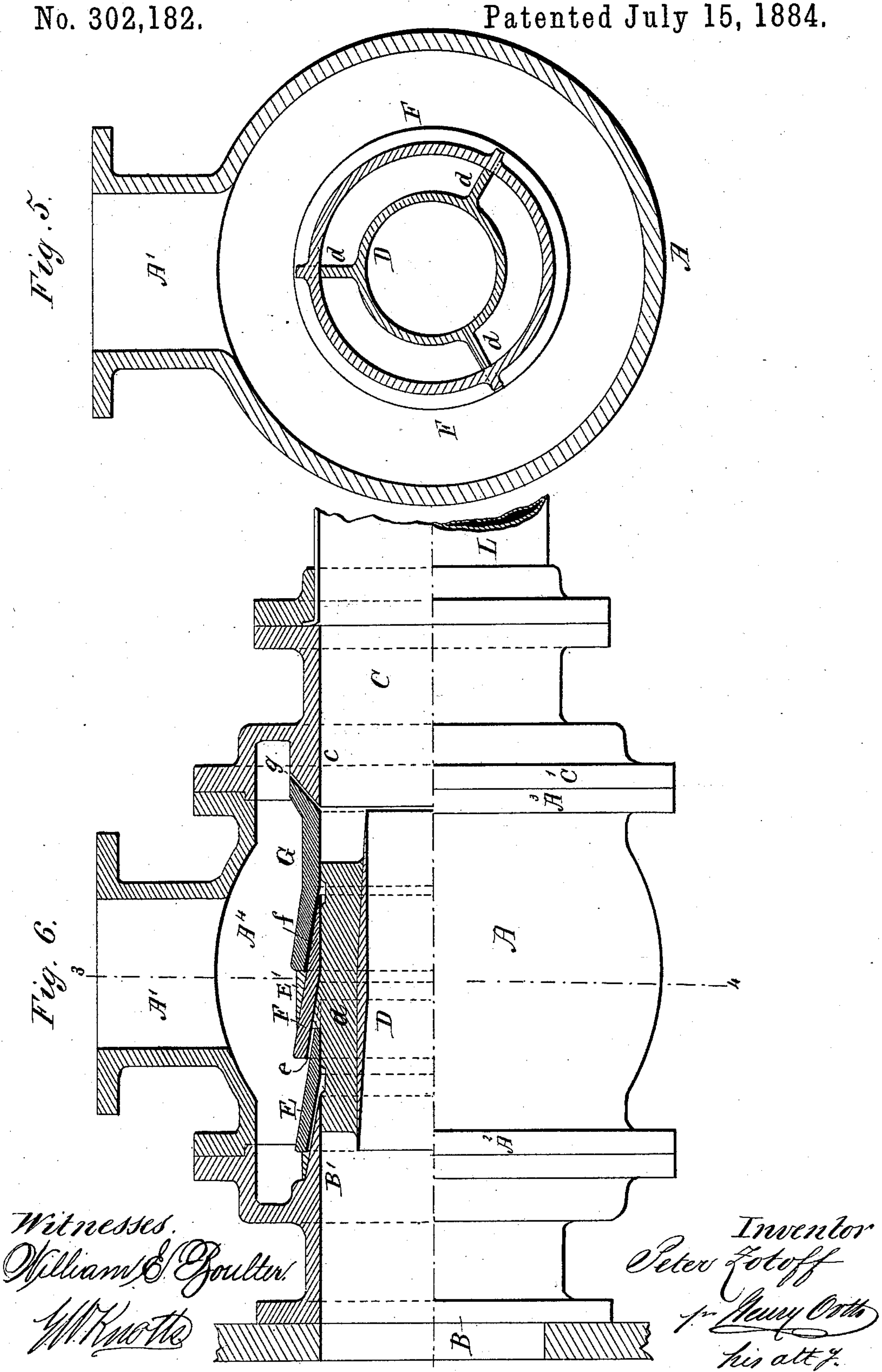
Figure 9:
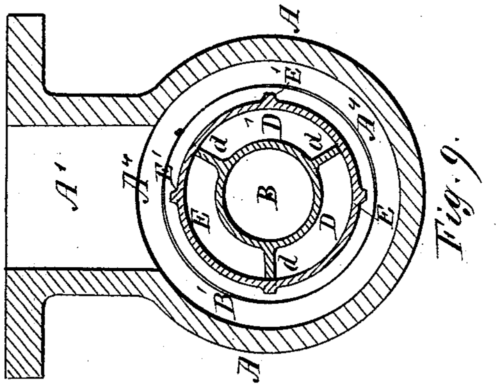
Figure 7:
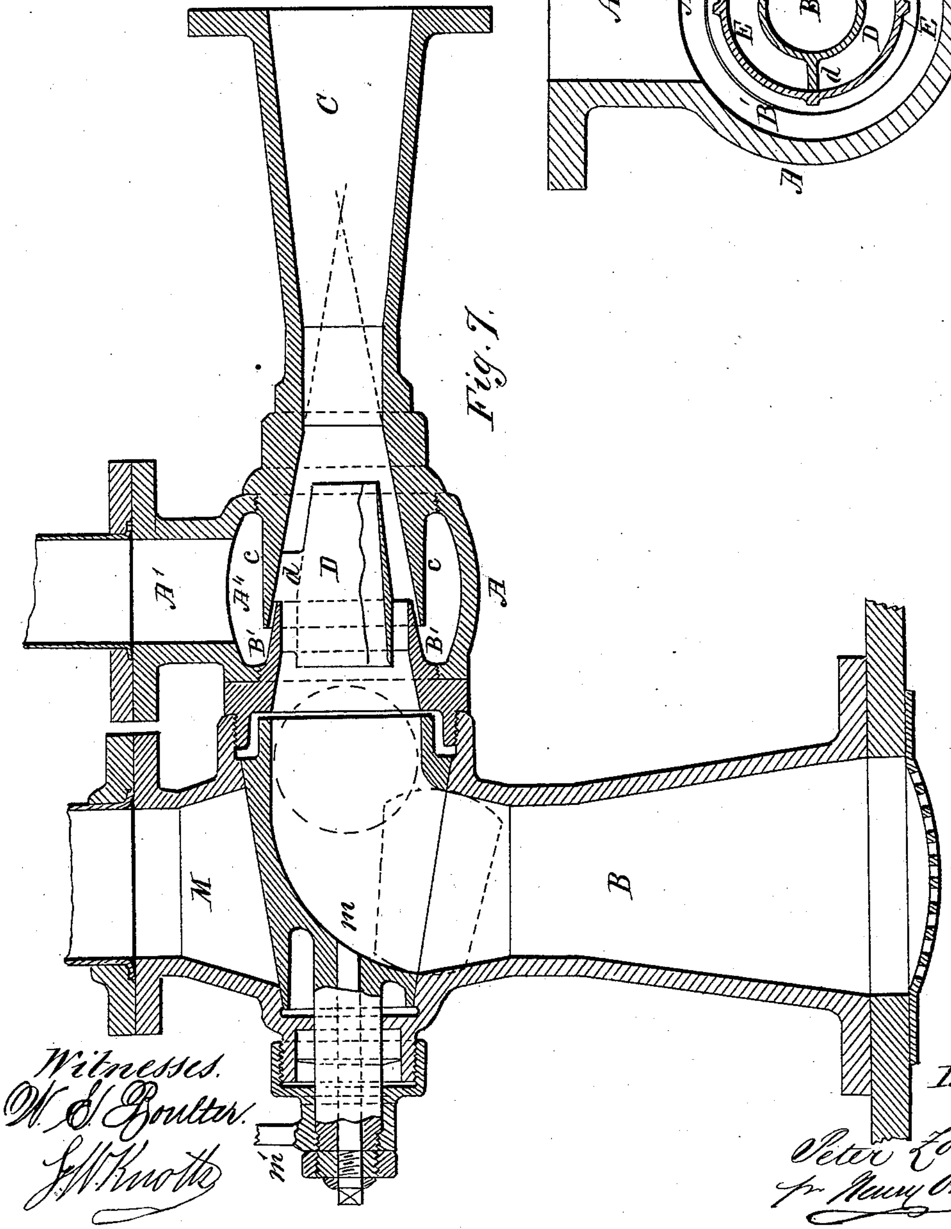
Figure 8:
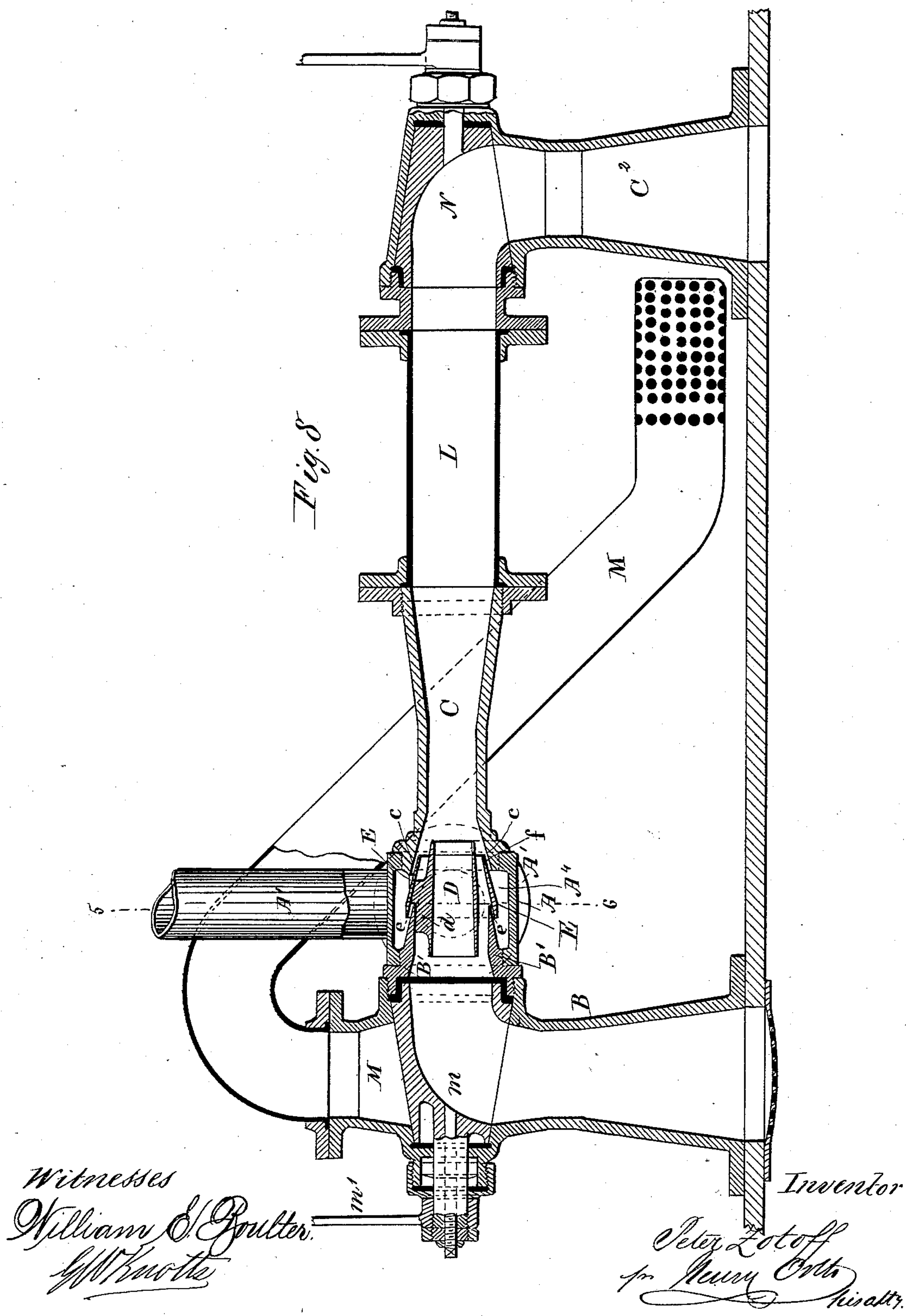
Figure 10:
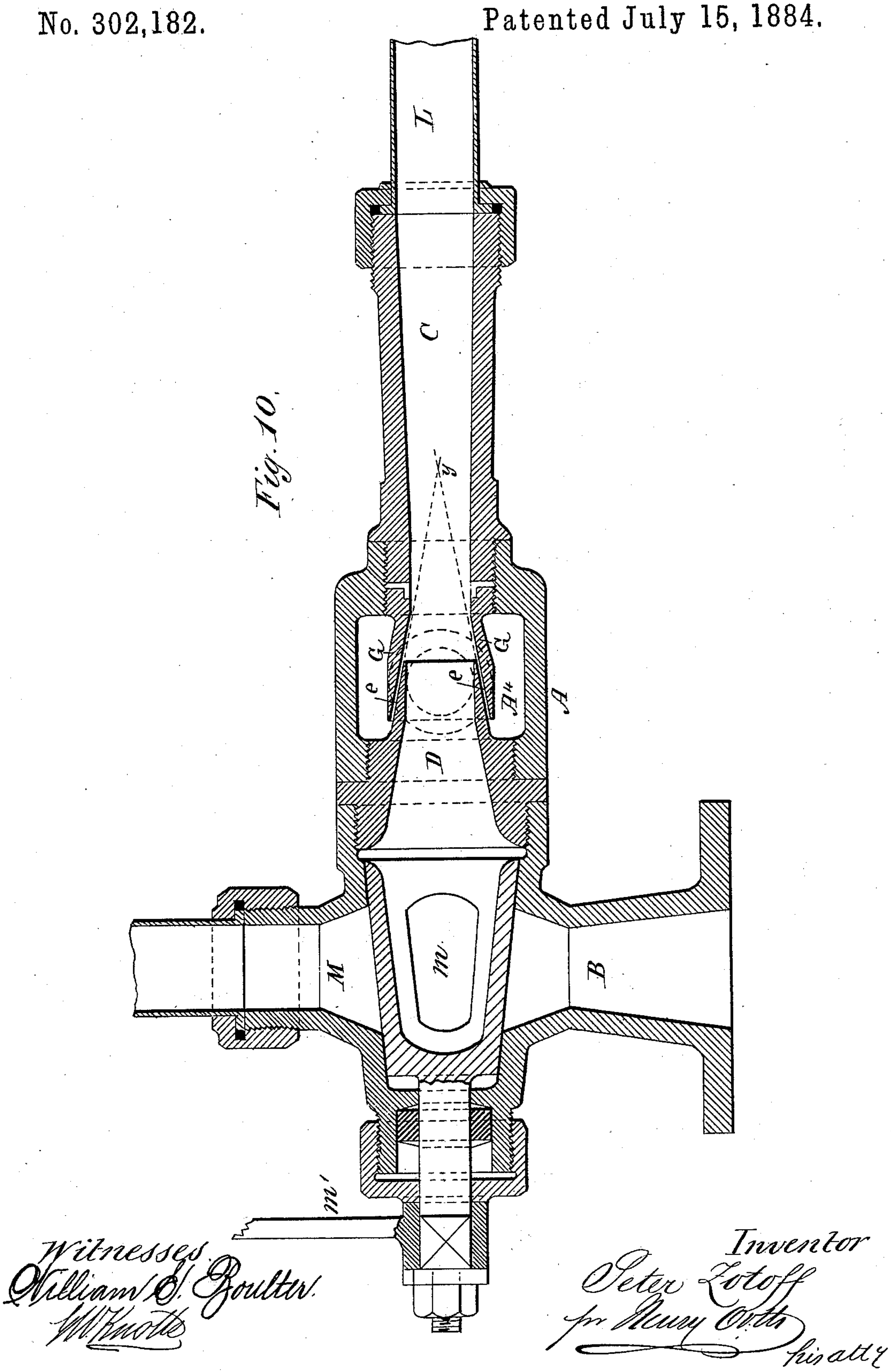
Figure 11:
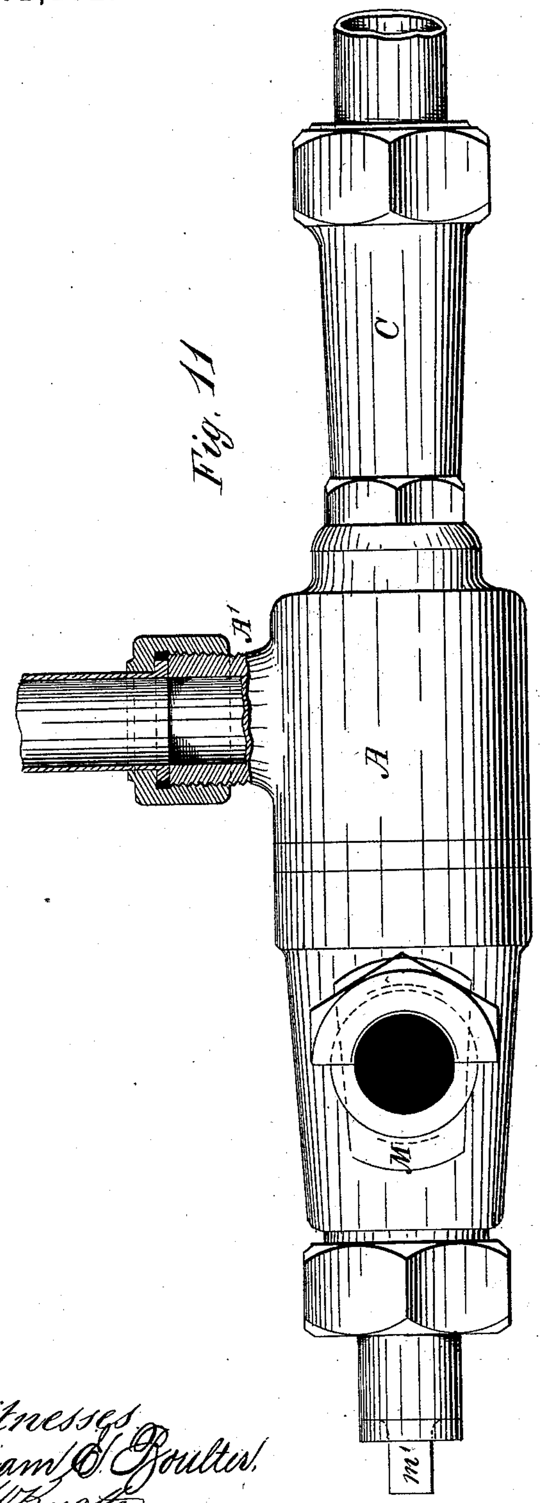
Figure 12:
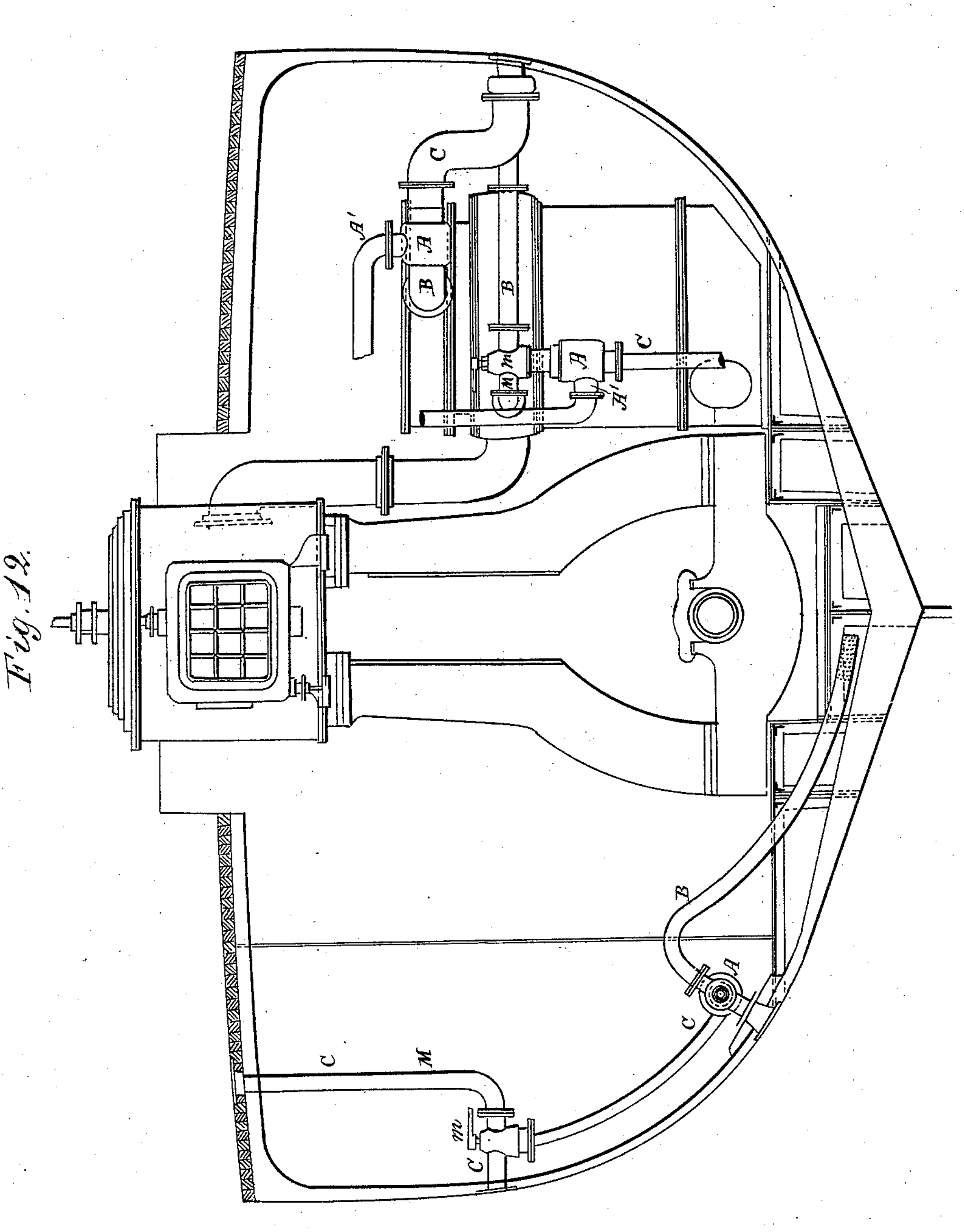

Figure 1 is a longitudinal section illustrating a typical construction of an ejector of great power. Fig. 2 is a transverse section thereof, taken on line 1 2 of Fig. 1. Fig. 3 is an elevation of the same, and Fig. 4 an end view looking in the direction of the arrow of Fig. 3. Fig. 5 is a transverse section taken on line 3 4 of Fig. 6, and the latter figure illustrates an ejector by a partial longitudinal section and elevation of slightly modified construction. Figs. 7, 8, and 10 are longitudinal sections of further modifications in the construction of the ejector. Fig. 9 is a transverse section taken on line 5 6 of Fig. 8. Fig. 11 is an elevation of the ejector shown in Fig. 10, and Fig. 12 shows the arrangement of the ejector for use in various ways on board of a steamship.

Like letters indicate like parts wherever such may occur in the above figures of drawings.

Referring to Figs. 1, 2, 3, and 4, the ejector therein shown is composed of a casing, A, provided with a steam-branch, A′, and coupling-flanges $A^2$ $A^3$ at its opposite ends. To the flange $A^2$ is bolted a water-branch, B, that terminates in a nozzle or cone, B′, which projects within the casing A, as shown. To the flange $A^3$ is bolted a discharging pipe or branch, C, that terminates with a nozzle or cone, *c*, or flaring mouth that projects also into casing A. Within the cone B′ of the water-branch B is fitted a cone, D, provided on its periphery with three or more or less ribs, *d*, that serve to hold the said cone within the cone B′ and centrally thereof. Around the nozzle or cone B′ is fitted a nozzle or cone, E, of slightly greater diameter at that point which surrounds cone B′, so as to leave an annular steam-passage, *e*, said cone being provided with ribs or abutments E′. Around the cone E is fitted a nozzle or cone, F, of greater diameter than the smaller or tapering forward end of cone E, around which said cone F is fitted in such manner as to leave an annular steam-passage, *f*, between the two. Upon the inner end, *c*, of the discharge-branch C is seated a nozzle or cone, G, adapted for adjustment toward or from the cone F, as hereinafter more fully described. As shown in Fig. 1, the nozzles or cones B′, E, F, and G are of considerably less diameter than the casing A, to form an annular steam-chamber, $A^4$, that surrounds said cones. It will also be seen that the outer periphery of the cone-section B′ and the inner periphery of the cone E taper toward the discharge-branch, and if extended their apices would be about the point *y*; hence the trajectory of the steam passing between the cones would be on lines extending from the annular passage *e* to point *y* in the discharge-branch C at a considerable distance from said passage *e*, while the trajectory of the steam passing through the passage *f*, formed by the outer periphery of cone E and the inner periphery of cone F is in the same direction, but on lines converging in rear of point $y$ or at point $y'$, as shown in dotted lines in Fig. 1. In this manner, instead of the body of water enveloping the steam, as in ordinary ejectors or injectors, the water is enveloped by the steam which, producing the vacuum in the annular chamber D', formed by cone D, cone-sections B' c, and cones E, F, and G, propels the water entering branch B, forward into and through branch C with great force and velocity. The steam thus projected in the form of two hollow cones enveloping the water will be condensed almost as soon as its contact with the water takes place, or as soon as it combines therewith in the discharge-branch C, which latter thus performs the function of combining and discharging cone. The steam is thus disposed of without the slightest noise and is utilized as a source of great power, which is now practically lost.

I have hereinabove stated that the nozzle or cone-ring G is longitudinally adjustable upon the nozzle-section $c$. When the discharge of water by the ejector is greater than it is desired—that is to say, when it is desired to operate with a smaller volume or a slower stream of water—the cone-ring G is moved away from the cone F, so as to leave an annular steam-passage, $g$, (plainly shown in Fig. 6,) between the two, the same as between the nozzles or cones B' E and E and F, with this difference, that the trajectory of the steam passing through this annular passage $g$ is in a direction the reverse of the trajectory of the steam passing through passages $e f$. In other words, the steam is injected against the inflowing columns of steam around cone D, thus checking the velocity of the latter, and consequently diminishing the volume of water passing through the ejector.

It will be seen that the angle $y^2$, formed by the inner periphery of the rear end of cone F and by the outer periphery of the cone-ring G, if projected, is much more obtuse than the angles formed by the projection of the passages $e f$, the steam performing here the function of a check to the velocity of the water instead of a means for propelling the same. The adjustment of the cone G is effected as follows:

The cone is provided with a pillar or standard, $g'$, in which operates a screw-spindle, $h$, that passes through a suitable stuffing-box, $h'$, and through the casing A. Upon its outer end the screw-spindle carries a pinion, H, that meshes with a toothed wheel, I, to one face of which is secured an index, $i$, arranged to travel over a scale, J, secured to the flange C' of the discharge-branch C. The wheel I is mounted on a stud or short shaft, $i'$, or on one of the bolts used to connect the casing and discharge-branch, said shaft carrying also a hand-wheel, I', or other suitable means for rotating the wheel I, both the latter and the wheel I' being rigidly connected together and free to rotate upon the bolt $i'$.

It is evident that by rotating the wheel I in one or the other direction, the cone G will be moved toward or from the cone F, forming a steam-passage, $g$, of greater or less extent, and in this manner the antagonizing effect of the steam upon the inflowing water may be regulated with great nicety. The cones or nozzles E F are held in their relative positions by means of screw-bolts K, passing through lugs F' formed on the cone F, and through like lugs $A^5$ formed on the casing A, said cones E F being held concentrically by the ribs $d$ of the cone D, as shown in Fig. 2, the rear end of the cone F abutting against the ribs or projections E' of cone E.

Although it is desirable that the ejector should be provided with means for regulating the area of the steam-passage $g$, this is not necessary under all conditions of use, and a fixed area may be given to said passage, as shown in Figs. 5 and 6, and the adjusting mechanism dispensed with. The water-branch B is in direct communication with the water-supply, be it the open sea, the bilge-water, or a tank or reservoir, or the condenser of a powerful steam-engine, or other source of supply, according to the conditions under which the ejector is used. The discharge-branch is connected with a pipe, L, (shown in Figs. 6, 10, and 11,) to conduct the water away, or it may be connected with a hose and the water ejected utilized for washing decks, or as a fire-extinguisher, or for other purposes, or said branch may discharge directly into the sea above or below the water-level.

When the ejector is used as a noiseless steam-exhausting ejector, then steam is allowed to pass from the steam-chamber $A^4$ through all three of the annular steam-passages, $e, f,$ and $g$, the latter passage being, however, so adjusted as to allow a smaller volume of steam to pass through than is passing through passages $e f$. In consequence of this the flow of water through the ejecter will be slow, its velocity being controlled by the counter steam-current, and the action of the latter by the adjustable nozzle or cone G. The steam passing into the ejector will be condensed and discharged with the water without the slightest noise.

By providing means for injecting steam in a direction opposite to that of the flow of water, a small volume of such will be required for efficient work; consequently the dimensions of the apparatus as well as the diameter of the discharge-orifice—such as a valved opening in the side of a vessel or a Kingston valve—may be considerably reduced and made much smaller than ejectors of usual construction. For ejecting bilge-water the steam-passage $g$ can be closed and steam injected through the annular passages $e$ and $f$.

Under some circumstances the ejector may be worked with one steam-injecting nozzle or cone forming the annular passage $e$, as shown in Figs. 7 and 10, in combination with the central or water nozzle or cone, D. As shown in Fig. 7, there are two water branches, B and M, controlled by a two-way cock, *m*, operated by a handle, *m'*. By means of this construction the ejector may be placed in direct communication with the sea-water through branch B, or with a suitable reservoir or other head of water through branch M—as, for instance, with the injecting or circulation pipe of an injector or surface-condenser of a powerful marine engine. In this manner the ejector is connected with the condenser while the engine is running and with the water surrounding the steamship while the engine is stopped.

If desired, a second two-way cock, N, may be arranged in the discharge-branch C, or a branch, $C^2$, connected thereto, as shown in Fig. 8, so that the water may be discharged directly into the water surrounding the ship, or conducted to some other point within the ship for use—as for deck-washing or other purposes or in case of fire—by manipulating the two-way cocks N *m*.

For vessels requiring a smaller power for propulsion—such as steam-launches, steamboats, or for engines of low power or small size—the ejector shown in Figs. 10 and 11 will be found very efficient, and, as shown in the former figure, but one steam-passage *e* is employed, formed by cones D G, the ejector being provided with two water-branches, B M, for purposes hereinabove described.

In Fig. 12 the ejector is shown as performing the function of a bilge-pump on the one hand, and on the other it is connected with the condenser of the engine, both taking the exhaust-steam in any suitable manner.

Having thus described my invention, what I claim is—

1. The herein-described method of working ejectors, which consists in injecting steam in the form of one or more columns, so as to envelop or surround the inflowing body of water and propel the same forward, and injecting steam in a reverse direction to that of the flow of water, substantially as and for the purposes specified.

2. In an ejector, a nozzle or cone for the passage of the water, one or more steam nozzles or cones surrounding the water-cone to form an annular steam passage or passages whereby steam is injected in the direction of the flow of the water to envelope or surround the same, in combination with a steam-cone arranged to inject steam in a direction the reverse of that of the flow of water, substantially as described, for the purpose specified.

3. In an ejector, a nozzle or cone for the passage of the water, one or more steam nozzles or cones surrounding the water-cone to form an annular steam passage or passages whereby steam is injected in the direction of the flow of water to surround or envelop the same, in combination with an adjustable steam-cone arranged to inject steam in a direction the reverse of that of the flow of water, substantially as described, for the purposes specified.

4. An ejector composed of a casing, A, having steam, water, and discharge branches, arranged as described and shown, in combination with the water nozzle or cone D, one or more steam nozzles or cones, E, F, and D, surrounding cone G, and arranged to inject steam around cone D in opposite directions, substantially as described, for the purposes specified.

5. An ejector composed of a casing, A, having steam and discharge branches, and two water-branches, B M, and suitable ejecting cones or nozzles, in combination with the two-way cock *m*, substantially as described, for the purposes specified.

6. An ejector composed of a casing, A, having steam-inlet branch, two water-branches, and two discharge-branches, and suitable ejector nozzles or cones, in combination with the two-way cocks *m* N, substantially as described, for the purpose set forth.

7. The combination, with the casing A, having steam-branch A', the water-branch B, constructed with the nozzle or cone B', and the discharge-branch C, constructed with the nozzle or cone *c*, of the nozzle or cone D and the nozzles or cones E F, arranged relatively to one another for operation substantially as and for the purposes specified.

8. The combination, with the casing A, having steam-branch A', the water-branch B, constructed with a nozzle or cone, B', and the discharge-branch C, constructed with the nozzle or cone *c*, of the nozzles or cones D, E, F, and G, arranged relatively to one another, for operation substantially as and for the purposes specified.

9. The combination, with the casing A, having steam-branch A', the water-branch B, constructed with a nozzle or cone, B', the discharge-branch C, constructed with the nozzle or cone *c*, and the cones E F, of the cone G, and mechanism, substantially such as shown and described, for adjusting the cone G relatively to cone F, all constructed and arranged for operation substantially as described, for the purposes specified.

In testimony whereof I have signed my name to this specification in the presence of two subscribing witnesses.

PETER ZOTOFF.

Witnesses:
FREDERICK KAUPE,
NICHOLAS TSCHEKALOFFE.